Patented Nov. 17, 1936

2,060,948

UNITED STATES PATENT OFFICE 2,060,948

METAL BEARING FLUX

Samuel R. Oldham, Chicago, Ill., assignor, by mesne assignments, to Union Carbide and Carbon Corporation, a corporation of New York No Drawing. Application May 16, 1933, Serial No. 671,363

5 Claims. (Cl. 148—24)

This invention relates to welding and to an improved welding flux; and more particularly pertains to the art of armoring railway track members and other mechanical parts subject to wear as well as welding and building up portions of such members and parts.

It has heretofore been extremely difficult and in most instances practically impossible to satisfactorily repair worn or damaged portions of extremely hard tough metal track members, such as manganese steel frogs. The proper manganese content for maximum toughness and wearing qualities is between 11 and 15 per cent, and the application of a welding flame to the surface of such manganese castings with subsequent fusing tends to lower the percentage of manganese and to weaken the casting.

In the application of welding rod material, by high temperature means, as a welding blowpipe or an electric arc, to base metals for the purpose of building up a sheath or armor capable of withstanding severe wear and shock, the bond or weld which is made between the base metal and the applied material should be of a homogeneous crystalline structure as strong as the metals which the bond unites. The character of the bond between certain alloy base metals is determined in many cases by the kind of flux employed when the welding rod is applied.

Heretofore the application of a hard wearing material to form a practically homogeneous and strong union with manganese steel base metal has not been satisfactorily accomplished. Failure at the weld by weakening of the base metal has made the building up of manganese steel frogs and other worn manganese steel railway members impractical, and no method of repair has been discovered for maintaining such members continuously in service. Chipping or cracking of the deposited metal at the weld has rendered repaired cast manganese steel unsafe both for track members and for mechanically operating parts.

An object of this invention is to provide a flux for improving the bond between a base metal and a surfacing metal or alloy applied under high temperature heat.

Another object of this invention is to provide a flux having constituents which greatly improve the bonding action between manganese steel base metal and a deposited layer of applied weld metal, and improve the wearing qualities of the applied metal.

A further object of this invention is to provide a composite track member built up of manganese steel base metal and a hard metal applied to the wearing surface thereof and closely bonded to the base metal.

Several expedients have been proposed for restoring wearing surfaces, which have been more or less damaged, by providing a new surface of a material particularly constituted to withstand wear. The present invention relates to a flux for preparing worn surfaces and particularly surfaces of manganese steel members in order to receive the material of welding rods which have relatively high melting points and require that the base metal be prepared in a special manner to receive the rod material as it is deposited. The use of a flux containing metals and other constituents which have a melting point between that of the base metal and that of the welding rod tends to make the application of desirable welding metal a reasonably simple operation.

An especially adapted welding rod for application to worn metal surfaces comprises a ferrous rod having a chromium content between 1 and 3 per cent, a carbon content below 1 per cent, silicon between 0.3 and 1.5 per cent and manganese between 0.5 and 1.75 per cent. A welding rod of this character is described in Patent No. 1,511,111 issued to J. H. Critchett and has a relatively high melting point, so that a high temperature flame is required to apply the rod in building up worn surfaces.

The flux may comprise a mixture of powdered nonferrous alloy, such as those disclosed in U. S. Patent 1,057,423, chiefly composed of cobalt, chromium and tungsten or molybdenum, together with sodium borate and a paste material, such as sodium silicate. When this flux is applied to the surface of the metal to be built up or welded, the flux sweats or tins under the welding heat and provides a protective film which tends to prevent oxidation of the base metal. The protective action of the flux also substantially prevents loss of manganese content from manganese steel castings when high temperature welding heat is directed on the surface of the castings. The powdered cobalt, chromium, tungsten alloy fuses and runs onto the surface of the base metal, lifting the undesirable oxides to the top of the weld puddle where they are not in a position to weaken the weld. The cobalt, chromium, tungsten alloy also tends to form an alloy with the added metal from the welding rod, thus increasing the wearing qualities of the finished surface. As the weld cools a strong bond will be formed between the base metal and the added metal.

The addition of oxides of elements in the base metal to the paste material in the flux further improves its protective action. Manganese oxide and ferric oxide may be added in powdered form to the adhesive material when the flux is to be applied to the surface of a manganese steel casting in preparation for receiving deposited weld metal. In building up a wear-resistant layer on base metal having steel and different alloy constituents, oxides of iron and of the various constituent alloys will be found to increase the effectiveness of the flux when added in small amounts. These oxides have the effect, when fused under a welding flame, of cleaning the surface of the base metal so as more readily to receive the tinning or coating of cobalt, chromium, tungsten alloy.

When ferrous metals are to be welded, a paste material, such as sodium silicate may be employed. For nonferrous welding however other common materials not containing silicon are more suitable in a flux for welding or surface coating the base metal.

Powdered metals other than cobalt, chromium, tungsten alloy may also be employed in the flux, it being desirable to use a metal which will aid in forming a bond and which will also alloy to some extent with the added welding rod metal so as to form a better wearing surface.

It will be appreciated that a flux such as the one described may be used in applying a coating of wear-resistant material, as cobalt, chromium, tungsten alloy, to the surface of parts, such as pump impellers, conveyor screws, plow shares, shear plates, and others not readily adaptable to the ordinary application of hard surfacing rod with a blowpipe. The flux together with the cobalt, chromium, tungsten alloy in powdered form may be applied to the part and subsqeuently heated in a furnace or by other media so as to obtain a wearing surface which is inseparably fused to the part.

I claim:—

1. A welding flux comprising sodium borate, a paste material and a powdered nonferrous alloy composed chiefly of cobalt, chromium and tungsten.

2. A flux for use in welding alloy metals, said flux comprising sodium borate; a paste material and oxides of said alloy metals; and a powdered nonferrous alloy composed chiefly of cobalt, chromium and tungsten.

3. A welding flux for use in welding ferrous alloys, said flux comprising sodium borate; sodium silicate and oxides of said alloys; and a powdered nonferrous alloy composed chiefly of cobalt, chromium and tungsten.

4. A flux for use in welding manganese steel, said flux comprising sodium borate; a paste material composed of about ⅔ sodium silicate, ⅙ ferric oxide and ⅙ manganic oxide; and a powdered nonferrous alloy composed chiefly of cobalt, chromium and tungsten.

5. A welding and brazing flux for welding metals, said flux comprising sodium borate; a paste material together with oxides of the metals; and a powdered nonferrous alloy composed chiefly of cobalt, chromium and tungsten.

SAMUEL R. OLDHAM.